United States Patent [19]
Marillier

[11] Patent Number: 5,667,892
[45] Date of Patent: Sep. 16, 1997

[54] MULTICOLORED FLAKES

[75] Inventor: Robert Marillier, Hauteville-les-Dijon, France

[73] Assignee: Sarl Quadra Industries, Villejuip, France

[21] Appl. No.: 423,810

[22] Filed: Apr. 18, 1995

[30] Foreign Application Priority Data

Apr. 26, 1994 [FR] France ................................ 94 05000

[51] Int. Cl.$^6$ ................................ B32B 5/16; C09C 1/62; C04B 14/04
[52] U.S. Cl. ........................ 428/403; 106/404; 106/417; 106/418; 106/436; 106/440; 106/442; 106/456; 106/481; 106/499; 428/404; 428/407
[58] Field of Search ...................... 428/402, 403, 428/407, 404, 327, 328, 329, 331; 106/404, 415, 417, 418, 436, 440, 442, 456, 481, 499

[56] References Cited

U.S. PATENT DOCUMENTS

| | | | |
|---|---|---|---|
| 4,309,480 | 1/1982 | Armanini | 428/403 |
| 4,968,351 | 11/1990 | Ahmed et al. | 106/402 |
| 5,008,143 | 4/1991 | Armanini | 428/407 |
| 5,154,765 | 10/1992 | Armanini | 106/401 |
| 5,336,309 | 8/1994 | Noguchi et al. | 106/23 |

FOREIGN PATENT DOCUMENTS 9323251  11/1993  WIPO.

Primary Examiner—H. Thi Le
Attorney, Agent, or Firm—Bachman & LaPointe, P.C.

[57] ABSTRACT

Multicolored flakes with two faces, having a thickness between approximately 60 μm and approximately 200 μm, consist in a film of uniform color of polymer, copolymer or terpolymer, or a mixture thereof, having on at least part of one face only a decorative coating different from the uniform color.

11 Claims, 1 Drawing Sheet

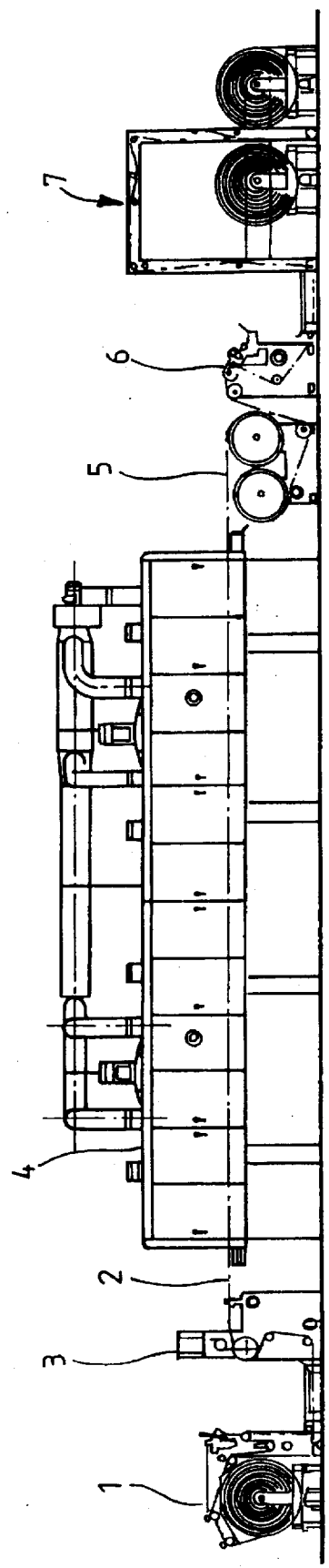
FIG_1

MULTICOLORED FLAKES

BACKGROUND OF THE INVENTION

1. Field of the invention

The present invention concerns new multicolored flakes used for example in products for decorating surfaces.

It also concerns a method of preparing these new flakes.

It further concerns a decoration product using the new flakes of the invention.

Hereinafter, for convenience and without limiting the invention, the expression "products for decorating surfaces" refers to paint, varnish, floor coverings, wallpaper, plastics material or fabric coverings used in the decoration of floors, walls, ceilings, screens, display panels, etc.

2. Description of the Prior Art

There are many methods of improving the appearance of surfaces in public places, the home and elsewhere. The application of one or more coats of paint to conceal the materials from which the surface is made is standard [practise] practice. Many different types of paint have therefore been developed, depending on the nature of the surfaces to be covered and the final finish required. One category of paints frequently employed for this purpose is so-called "flake" paint which gives a three-dimensional impression on the surface to which it is applied.

This type of coating usually includes a first layer of paint called the undercoat or support layer onto which uniformly colored flakes are sprayed using a system comprising a compressor and a gravity-fed spray gun for dry flakes, as marketed under the tradename SAGOLA®, for example. The flakes are sprayed before the first coat is dry, the light flakes adhering to the support layer and covering it partly or totally, depending on the required effect. A layer of varnish is then applied to the surface to strengthen the adhesion of the flakes to the support layer and to cover both with a protective layer.

This type of paint provides a uniformly colored surface if flakes which are all the same color are used, but multicolored surfaces can be obtained by using flakes of different colors mixed together before they are sprayed onto the surface.

In the latter case the method has a number of drawbacks. The user must first mix the various kinds of flakes together in a very homogeneous manner to avoid areas of the surface being sprayed with a single kind of flake. A large number of batches of flakes of different colors must be stored to be sure to have available the colors needed to obtain the required multicolored effect on the surface. The flakes are usually marketed in containers weighing between about 15 kg and about 20 kg, representing a considerable amount of storage.

A main object of the invention is to remedy the above drawbacks by proposing new flakes which solve most of the problems associated with storage and mixing.

SUMMARY OF THE INVENTION

In a first aspect, the invention consists in multicolored flakes with two faces, having a thickness between approximately 60 μm and approximately 200 μm, in the form of a film of uniform color of polymer, copolymer or terpolymer, or a mixture thereof, having on at least part of one face only a decorative coating different from the uniform color.

In accordance with the invention the flakes therefore have a first face and a second face.

The uniform color of the first face of the flakes corresponds to the film of polymer, copolymer or terpolymer, or a mixture thereof, used as the raw material for the preparation of the flakes. The color is not critical in itself and can be chosen freely from the colors available in the paint industry.

The materials that can be used for the film can be chosen from polymers, copolymers, terpolymers or a mixture thereof. Non-limiting examples are acrylic or polyvinyl acetate polymers, styrene-acrylic, vinyl-versatate or vinyl-ethylene copolymers, vinyl-versatate-acrylate or vinyl ethylene chloride terpolymers, etc.

At least part of the second face of the flakes of the invention has a decorative coating different from the uniform color of the first face. This different decorative coating can take various forms.

In a first embodiment of the present invention the second face is a different color than the first face and is colored either uniformly or non-uniformly, for example with spots or blobs of varying density or clarity.

The materials that can be used for the decorative coating in this first embodiment of the invention can be chosen from paint, ink, varnish and/or similar materials routinely used in the paint industry.

Examples are emulsion paint, glycerophtalic paint, water-soluble paint, enamel paint, aminoplast paint, epoxy paint, polyurethane paint, etc.

The ink that can be used can be chosen from typographical ink, offset ink, heliolink, varnish ink, alcohol ink, magnetic ink, etc.

The varnishes that can be used can be chosen from oil-based varnish, varnish based on natural or artificial resins, cellulose varnish, bituminous varnish, latex varnish, rubber varnish, natural varnish, etc.

In one embodiment of the invention the decorative coating includes a layer of at least one paint, ink, varnish and/or the like. A plurality of paints of different colors can be used to obtain a multicolored second face, for example.

In another embodiment of the present invention the second face includes pigments of the same or different colors, for example pigments sensitive to heat or to ultraviolet light, nacreous pigments, especially [TRIODINE®] IRIODINE® pigments, or pigments that do not mix with each other, routinely used in the paint industry.

In another embodiment of the present invention the second face includes metal particles, in particular particles of aluminum, copper, nickel, iron, etc. in particular in the form of their oxide.

In a further embodiment of the present invention the second face includes mineral particles, for example particles of mica, silica, etc.

In a further embodiment of the present invention the second face includes printed patterns, for example patterns printed using inkjet or conventional offset techniques.

It goes without saying that the embodiments described above can be combined to obtain flakes in which the second face includes both paint and pigments or both pigments and mineral particles, for example.

The flakes of the invention are advantageously between approximately 60 μm and approximately 200 μm thick, preferably between approximately 90 μm and approximately 110 μm thick.

The invention also consists in a method of preparing flakes of the invention.

This second aspect of the invention consists in a method of preparing multicolored flakes with two faces consisting in a uniform color film of a polymer, copolymer or terpolymer, or a mixture thereof, having on at least part of one face only a decorative coating different from the uniform color, which method includes the steps of:

depositing a raw material onto a conveyor belt at a rate preferably between approximately 10 m/min and approximately 25 m/min and to a thickness preferably between approximately 80 µm and approximately 240 µm, to obtain a moist film;

depositing a decorative coating onto the moist film of raw material obtained in the preceding step, at a speed preferably between approximately 10 m/min and approximately 25 m/min;

drying the film on the conveyor at a temperature preferably between approximately 80° C. and approximately 150° C. to obtain a dry film;

stripping and grinding the dry film obtained in the preceding step;

grinding the fragments of the dry film obtained in the preceding step.

The raw material used in the method of the invention is a polymer, copolymer, terpolymer or a mixture thereof, as defined hereinabove, in the form of an aqueous emulsion.

The raw material used can be white or another color.

The raw material advantageously has a viscosity which is preferably between approximately 10 N.s/m$^2$ and approximately 30 N.s/m$^2$.

In accordance with the invention, the raw material is deposited onto a conveyor belt from a reservoir.

The choice of the conveyor belt is essentially conditioned by the subsequent stripping operation. The conveyor belt must have good wetability to allow homogenous distribution of the moist film of raw material during coating and also have low adhesion so that stripping is satisfactory.

Non limiting examples of belts that can be used are silicone-coated polyester belts, silicone-coated paper belts and TEFLON® coated fabric belts.

The thickness of the deposited film of raw material is between approximately 80 µm and approximately 240 µm and is controlled by means of a coating blade disposed close to the surface of the belt, for example. The raw material is preferably deposited onto the conveyor belt at a rate between about 10 m/min and about 25 m/min.

The method of the invention then includes the deposition of a decorative coating on the moist film formed by the raw material. The decorative coating advantageously consists in a layer of at least one paint, ink, varnish and/or the like as defined hereinabove.

The decorative coating advantageously has a viscosity which is preferably between approximately 0.1 N.s/m$^2$ and approximately 0.25 N.s/m$^2$.

The decorative coating can be deposited by any appropriate means, and usually depends on the required final appearance of the coating. If the coating is a uniform layer of paint or spots or blobs of paint disposed at random on the moist film, the deposition can be carried out by spraying, in particular using a spraygun.

It is also carried out by spraying, in particular using a spraygun, if the decorative coating consists of paint pigments or metal or mineral particles.

The person skilled in the art can by trial and error determine the optimum conditions for spraying the decorative coating to obtain either a uniform deposit or spots or blobs deposited non-uniformly. The spray air pressure is preferably between approximately 0.1 MPa and approximately 0.35 MPa and the pressure of the product at the exit from the spray gun is preferably between approximately 0.05 MPa and approximately 0.3 MPa.

If the decorative coating is a printed pattern, the deposition can be effected by inkjet printing or by offset printing.

The moist film obtained is then dried at a temperature between approximately 80° C. and approximately 150° C., for example by passing it through a pulsed air oven heated by a heating fluid.

The dry film is then stripped and broken off from the conveyor belt to reduce the size of the flakes a first time, after which it is placed in a grinder, for example an Adler-Buzzi Renato type C2 grinder, to obtain flakes of even smaller size. Although the size of the flakes is not critical in itself, a mean flake size between approximately 1 mm and approximately 10 mm achieves good adhesion of the flakes combined with a satisfactory aesthetic effect.

The invention also consists in a product for decorating surfaces using the flakes of the invention.

The product of the invention for decorating surfaces includes:

a support paint, in particular an acrylic type paint;
a protective varnish, in particular an acrylic type varnish;
at least one batch of flakes of the invention.

The decoration product of the invention is used as follows:

The support paint is applied to the surface to be decorated. Before the paint drys the flakes of the invention are sprayed onto the support paint, for example using a SAGOLA® type device.

Because both sides have substantially the same density, each flake sprayed adheres to the support paint via one face or the other, at random. The surface covered by the flakes therefore has a multicolored appearance made up of flakes showing their uniform color face and flakes showing their face with the different decorative pattern, the percentage of flakes adhering via their uniform color first face being always substantially the same and the percentages of flakes adhering via their second, differently coated face being also substantially always the same.

The varnish is then applied to the flakes to protect the surface and to improve the final appearance.

The invention overcomes the problems of storing and mixing conventional prior art flakes as used until now. A single batch of flakes is sufficient to obtain a multicolored surface. The operation of mixing different flakes of different colors is eliminated.

Although the invention has been described above with reference to the use of a single batch of flakes, it is obviously possible to use a plurality of batches of different flakes, depending on the final effect required. In this case the storage problems are still significantly reduced by using the flakes of the invention since a single batch of flakes produces the result which in the prior art requires at least two batches of flakes.

Other advantages and features of the invention will emerge from the following more detailed description of one embodiment of the invention given by way of non-limiting illustrative example only and from the signal figure referred to therein which is a diagrammatic side view of a device for implementing the method of manufacturing flakes of the invention.

BRIEF DESCRIPTION OF THE DRAWING

In the single FIGURE, the flakes of the invention are made using a machine including a paper or cloth unspooler 1 around which is wrapped a conveyor belt 2. The conveyor belt consists in a strip of polyester coated with silicone.

A 500 liter storage tank containing acrylic emulsion with a mean viscosity of 21 N.s/m$^2$ (as measured with a Brookfield viscosity meter, axis 6, 20 rpm) is fed to a coating cylinder 3 either via a pump or manually. The raw material is deposited onto the conveyor belt 2 which travels at a speed of 15 m/min.

The thickness of the deposited paint film is controlled by a coating blade so that the thickness of the final film is approximately 120 µm.

The conveyor belt 2 carrying the moist film then reaches a manifold (not shown in the FIGURE) equipped with XV type droplet sprayguns with in-head circulation (available under the trade name VOLUMAIR®) fitted with 1.5 mm diameter nozzles with a spray diameter of 2 mm. The sprayguns are fed by pumps connected to an acrylic paint storage tank available from the company S.N.F.P.

The second paint, to constitute the decorative pattern, has a viscosity in the order of 0.15 N.s/m$^2$ to 0.17 N.s/m$^2$ and is a different color from the base paint. At this stage of the method of the invention the paint is sprayed onto the moist base paint film as the conveyor belt 2 continues to move, using a spray air pressure between approximately 0.25 MPa and approximately 0.3 MPa and with a product pressure of approximately 0.25 MPa.

The conveyor belt 2 carrying on its surface the moist base paint film onto which the decorative paint has been sprayed in the form of droplets then enters an oven 4 fitted with ventilation pipes and heated to a temperature of 120° C.

On leaving the oven 4 the conveyor belt 2 carrying the dried film on its surface enters cooling rollers 5 and then a stripping unit 6. In addition to separating the dry film from the conveyor belt 2, this unit includes a device for coarse grinding of the film.

At the end of the process the conveyor belt 2 enters the installation 7 consisting in a paper or cloth spooler provided with a device for aligning and adjusting the tension of the belt.

The flakes obtained after a further stage of grinding the dried film recovered after stripping and coarse grinding have one face the color of the base paint and the other face carrying droplets of the second paint sprayed from the spraygun manifold. The flakes obtained in this way have a size of approximately 3 mm.

It goes without saying that the invention is not limited to the embodiment specifically described above. Various modifications can be made, both in terms of the nature of the materials used and in terms of the form of the decorative coating or the adjustments of the various steps of the process, for example, without departing from the scope of the invention which is defined by the following claims.

There is claimed:

1. Multicolored flakes with two faces, having a thickness from approximately 60 µm to approximately 200 µm, in the form of a film of uniform color formed from a material selected from the group consisting of a polymer, a copolymer, a terpolymer, and mixtures thereof, said flakes having on at least part of one face only a decorative coating different from the uniform color.

2. Flakes according to claim 1 wherein said decorative coating consists of a uniform layer of at least one of paint, ink, and varnish.

3. Flakes according to claim 1 wherein said decorative coating consists of a non-uniform layer of at least one of paint, ink, and varnish.

4. Flakes according to claim 1 wherein said decorative coating consists of printed patterns.

5. Flakes according to claim 1 wherein said coating consists of mineral particles.

6. Flakes according to claim 5 wherein said particles comprise mica or silica particles.

7. Flakes according to claim 1 wherein said decorative coating consists of metal oxide particles.

8. Flakes according to claim 7 wherein said metal oxide particles include particles of at least one metal oxide selected from the group consisting of iron oxide, nickel oxide, copper oxide and aluminum oxide.

9. Flakes according to claim 1 wherein said uniform color film includes a polyvinyl acetate or acrylic polymer, a styrene-acrylic, vinyl-versatate or vinyl-ethylene copolymer, or a vinyl-versatate acrylate or vinyl-ethylene-chloride terpolymer.

10. Flakes according to claim 1 wherein said decorative coating consists of pigments selected from the group consisting of pigments which change color with heat, pigments which change color with exposure to ultraviolet light, pigments that do not mix with each other, and nacreous pigments.

11. Flakes according to claim 1 wherein said decorative coating consists of metal-containing particles.

* * * * *